United States Patent Office 3,163,214
Patented Dec. 29, 1964

3,163,214
SOLVENT-WATERFLOOD OIL RECOVERY
PROCESS
Albert K. Csaszar, Dundee, Ill., assignor to The Pure Oil
Company, Chicago, Ill., a corporation of Ohio
No Drawing. Filed Nov. 13, 1961, Ser. No. 152,047
9 Claims. (Cl. 166—9)

This invention relates to an improved method for the recovery of petroleum from underground reservoirs. More particularly, this invention relates to a solvent-waterflood process by which increased quantities of petroleum can be economically recovered.

The prior art recognizes various secondary-recovery techniques by which additional quantities of oil can be recovered from depleted reservoirs. The most commonly used such technique is the well-known waterflood. The prior art further recognizes that the efficiency of such floods can be improved by employing one or more solvents which are injected into the reservoir prior to the introduction of floodwater. It has been proposed, for example, to inject a hydrocarbon solvent, which may be any of the numerous petroleum fractions of moderate or low viscosity, before the introduction of floodwater. It has further been proposed to inject slugs of thickened floodwater having viscosities approximating that of the crude oil, before the introduction of normal floodwater. It has also been suggested that surface active agents or other treating agents be incorporated in the water which is introduced into the reservoir.

While all of the above methods have met with some degree of success, it has never been possible to recover all of the petroleum known to exist in subterranean reservoirs, and the search continues for methods by which additional quantities of petroleum can be economically produced.

It is a primary object of this invention to provide an improved secondary-recovery process by which additional quantities of oil may be recovered. Another object of this invention is to provide an improved secondary-recovery process which utilizes floodwater in conjunction with solvents of moderate cost. Still another object of this invention is to provide a method for recovering additional quantities of oil from reservoirs which have been subjected to conventional waterflood to the economic limit of oil recovery by that method.

Briefly, in accordance with this invention, a slug of a mixture of a soluble oil and an inert, non-aqueous solvent therefor, is injected through an input well and into a subterranean formation. Floodwater is then injected to drive the mixture toward one or more producing wells, from which petroleum is recovered. The volume of mixture injected will be between 0.05 to about 0.20 reservoir pore volume, and preferably about 0.10 reservoir pore volume. The injection of floodwater will be continued until the water-to-oil ratio at the producing well reaches an unattractively high level.

The term "soluble oil," as used in the specification and the appended claims, refers to well-known compositions which have the ability to spontaneously emulsify with water when admixed therewith. Soluble oils, while formulated from a wide variety of ingredients, consist essentially of a hydrocarbon phase, one or more soaps or non-soap surface-active materials, and a stabilizing agent which is usually a monohydric or polyhydric alcohol, but may be another partially oxygenated low-molecular-weight hydrocarbon, such as a ketone. Generally, the compositions contain some free organic acid, especially a fatty acid, such as oleic acid. The compositions and methods of manufacture of such soluble oils are well known, and do not form a part of the instant invention.

It has been found that the very high viscosities of soluble oils make it necessary to dilute the soluble oil with a suitable non-aqueous solvent, to reduce the viscosity thereof. The solvent must be inert in the sense that it is not reactive with the constituents of the soluble oil. Suitable solvents include low-molecular-weight hydrocarbon fractions, especially those principally comprising hydrocarbons having fewer than about 10 carbon atoms per molecule. Partially oxygenated low-molecular-weight hydrocarbons, such as alcohols having not in excess of about 4 carbon atoms per molecule, and especially isopropyl alcohol, are preferred. Also suitable are low-molecular-weight ketones, aldehydes, and organic acids, of which acetone and methyl ethyl ketone are preferred examples. The oxygenated-hydrocarbons solvent selected will preferably have a very substantial solubility in both oil and water. However, solubility in water is not an essential characteristic; hydrocarbons may be used as the solvent employed to reduce the viscosity of the soluble oil.

The quantity of solvent and soluble oil placed in a mixture may vary over rather wide ranges, it being desirable to employ proportions of soluble oil and low-viscosity solvent such as will produce a mixture having a viscosity not appreciably greater than that of the petroleum to be recovered, and preferably closely approximating that of the petroleum to be recovered. Thus the amounts of soluble oil and solvent employed will necessarily depend somewhat upon the viscosity characteristics of the specific soluble oil and solvent chosen, as well as upon the viscosity of the petroleum. The quantity of soluble oil employed will seldom be less than 10 percent or more than 50 percent of the mixture. Where isopropyl alcohol is employed as the solvent, as is preferred, the soluble oil will ordinarily comprise about 10 to 30 percent of the mixture.

Any of a wide variety of soluble oils which comprise a hydrocarbon phase, a soap or non-soap surface-active material, and a stabilizing agent, may be employed in the method of this invention.

Examples I–VII are typical of the numerous soluble oils which may be used in carrying out the process of this invention. Especially preferred are the compositions of Examples I and VII.

EXAMPLE I

| | Percent |
|---|---|
| Sodium sulfonate (⅓ oil) | 4.87 |
| High-resin tall oil acids | 3.02 |
| Diethylene glycol | 1.41 |
| Potassium hydroxide | 0.72 |
| Water | 1.00 |
| Extract (phenol) from 85 vis. neutral oil | 88.98 |

EXAMPLE II

| | |
|---|---|
| Sodium sulfonate (⅓ oil) | 10.06 |
| Oleic acid | 2.01 |
| Diethylene glycol | 1.64 |
| Potassium hydroxide | 0.27 |
| Water | 1.02 |
| Gulf Coast neutral oil | 85.00 |

EXAMPLE III

| | |
|---|---|
| Sodium sulfonate (⅓ oil) | 8.65 |
| Red oil | 2.36 |
| Diethylene glycol | 1.53 |
| Potassium hydroxide | 0.34 |
| Water | 0.99 |
| Mineral lubricating oil | 86.13 |

EXAMPLE IV

| | |
|---|---|
| Resin soap | 9 |
| Naphthenic soap | 9 |
| Resin | 2 |
| Naphthenic acid | 2 |
| Sulphonated castor oil | 3 |
| Butyl carbitol | 1 |
| Water | 4 |
| Mineral oil | 70 |

EXAMPLE V

| | |
|---|---|
| Mahogany sulphonates | 9.5 |
| Naphthenic acid | 2.5 |
| Sodium hydroxide | 0.4 |
| Water | 1.6 |
| Isopropyl alcohol | 0.9 |
| Sodium aluminate | 0.5 |
| Mineral oil | 84.6 |

EXAMPLE VI

| | |
|---|---|
| Dichlorobenzene | 10.0 |
| Methyl ethyl ketone | 10.0 |
| 85 vis. neutral oil | 80.0 |

EXAMPLE VII

| | |
|---|---|
| Magnesium naphthenate | 8.0 |
| Methyl ethyl ketone | 4.0 |
| High viscosity lubricating oil | 88.0 |

EXAMPLE VIII

| | |
|---|---|
| Potassium oleate | 10.0 |
| Oleic acid | 7.0 |
| Cyclohexanol | 3.0 |
| Paraffin oil | 80.0 |

Other suitable soluble-oil compositions are listed in "The Chemical Formulary," Bennett, Volume VIII, at page 119.

The effectiveness of the method of this invention has been demonstrated by laboratory experiments conducted on unconsolidated sand cores having a diameter of 1.25 inches and a length of 1 foot. The cores had pore volumes of approximately 130 cubic centimeters. Before each experiment, the cores were saturated with oil having a viscosity of about 6 centipoises, and then were driven by waterflood to residual oil saturation. (Residual oil saturation is that oil saturation at which no additional quantities of oil appear in the core effluent as the core is subjected to continuing waterflood. Thus, it represents the residual condition at which additional quantities of oil cannot be produced by conventional waterflood, irrespective of the period of time over which the flood is continued.) The effectiveness of the method of this invention, in comparison with other prior art methods, for recovering additional quantities of oil from cores driven to residual oil saturation by waterflood, is shown in the data compiled in the following table.

*Table I*

| Run No. | Type of Slug | Oil Saturation After Waterflood, cm.³ | Volume of Slug Injected (Pore volume, percent) | Net Oil Produced From Core, cm.³ | Percent of Oil In Place Recovered |
|---|---|---|---|---|---|
| 1 | IPA | 30 | 50 | 19.5 | 65 |
| 2 | IPA | 35 | 46 | 23 | 65.7 |
| 3 | 6-cp. Oil with 2% Triton X-45. | 27 | 50 | 13.5 | 75 |
| 4 | 6-cp. Oil with 0.3% Potassium Oleate, 1.7% Sodium Sulfonate. | 29 | 63 | 0 | 0 |
| 5 | 50% Hexane, 50% Ex. 2. | 30 | 30 | 26 | 83.4 |
| 6 | 90% IPA, 10% Ex. 1. | 32 | 50 | 30 | 93.7 |
| 7 | 90% Ethanol, 10% Ex. 1. | 21 | 50 | 17.5 | 83 |
| 8 | 70% IPA, 30% Ex. 1. | 30 | 50 | 24 | 80 |

Throughout the various runs, conditions of temperature, pressure, and flow rate were maintained as nearly uniform as practical from run to run, so that the results of the various runs are representative of the efficiencies of the processes tested.

In Runs 5 through 8, inclusive, the soluble oils of Examples I and II were employed, as indicated. The superiority of the method of this invention is demonstrated by a comparison of Runs 5 to 8 with Runs 1 to 4. In the first two runs, isopropyl alcohol was employed as the solvent. In Runs 3 and 4, a six-centipoise oil, in which was dissolved a surface-active agent or agents, was used as the treating slug. It will be observed that the use of a hydrocarbon containing surface-active materials, as distinguished from a soluble oil, results in inferior petroleum recoveries.

The soluble oil compositions used in the method of this invention may be prepared by the usual prior art techniques. The mixture to be injected can be made by merely mixing the selected soluble oil with a suitable inert solvent, as aforedefined. The soluble oils, which are predominantly hydrocarbon, and nearly anhydrous, are, of course, miscible with hydrocarbon fractions and with partially oxygenated, low-molecular-weight hydrocarbons. Soluble oils used in accordance with this invention should spontaneously form stable emulsions when mixed with any quantity of water within the range of 0 to about 10 volumes of water per volume of soluble oil. Properly prepared commercial soluble oils will readily meet this requirement, as will the soluble oils specifically disclosed in Examples I to VII. Thinning of the soluble-oil concentrate with a low-molecular-weight hydrocarbon solvent will, to some extent, decrease the stability of the emulsions formed on contact with water. Where partially oxygenated hydrocarbons are employed as the thinning solvent, the emulsions formed from the emulsion concentrate-solvent mixture will generally have enhanced stability. This is especially true when isopropyl alcohol is employed as the thinning solvent.

The embodiments of the invention in which an exclusive property or privilege is claimed are defined as follows:

1. The method of recovering petroleum from subterranean reservoirs penetrated by an injection well and a producing well comprising first injecting through said injection well and into said formation 0.05 to 0.20 pore volume of a mixture of a soluble oil, having the ability to spontaneously emulsify with water when admixed therewith, and an inert, non-aqueous solvent therefor, said mixture having a viscosity approximating that of said petroleum, and then injecting floodwater to drive said mixture toward said producing well, and recovering petroleum from said producing well.

2. The method in accordance with claim 1 in which said inert solvent is a low-molecular-weight hydrocarbon fraction.

3. The method in accordance with claim 1 in which said inert solvent is selected from the group consisting of methyl, ethyl, and isopropyl alcohols.

4. The method in accordance with claim 1 in which said inert solvent is isopropyl alcohol.

5. The method in accordance with claim 1 in which said mixture comprises 10 to 30% soluble oil, and 70 to 90% isopropyl alcohol.

6. The method in accordance with claim 5 in which said soluble oil is composed substantially as follows: 4.87% sodium sulfonate, 3.02% high resin tall oil acids, 1.41% diethylene glycol, 0.72% potassium hydroxide, 1.00% water and 88.98% of a phenol extract from 85 vis. neutral oil.

7. The method in accordance with claim 1 in which said soluble oil consists essentially of a hydrocarbon phase, at least one material of the group consisting of soaps and non-soap surface-active materials and a stabilizing agent.

8. The method in accordance with claim 7 in which said soluble oil contains a free organic acid.

9. The method of recovering petroleum from subterranean reservoirs penetrated by an injection well and a producing well, by injecting floodwater into said injection well to drive said petroleum toward said production well and recovering petroleum from said producing well, the improvement which consists of first injecting through said injection well, immediately ahead of said floodwater, 0.05 to 0.20 pore volume of an intermediate fluid consisting essentially of a mixture of a soluble oil having the ability to spontaneously emulsify with water when admixed therewith, and an inert, non-aqueous solvent therefor, said mixture having a viscosity approximating that of said petroleum whereby said petroleum is contacted by said mixture and separated from said floodwater by said mixture.

References Cited in the file of this patent
UNITED STATES PATENTS

| | | |
|---|---|---|
| 2,742,089 | Morse et al. | Apr. 17, 1956 |
| 2,910,123 | Elkins et al. | Oct. 27, 1959 |
| 2,988,142 | Maly | June 13, 1961 |